Patented Mar. 8, 1927.

1,619,953

UNITED STATES PATENT OFFICE.

CLAYTON OLIN NORTH, OF TALLMADGE TOWNSHIP, SUMMIT COUNTY, OHIO.

HIGHER ALDEHYDE DERIVATIVES OF REACTION PRODUCTS OF ALDEHYDES AND AMINES AND PROCESS OF MAKING SAME.

No Drawing. Original application filed March 24, 1923, Serial No. 627,325. Divided and this application filed March 5, 1926. Serial No. 92,616.

This application is a division of my application Serial No. 627,325, filed March 24, 1923.

My invention relates to a process of reacting aliphatic aldehydes higher than formaldehyde with condensation products of aromatic primary amines and aliphatic aldehydes, and particularly reacting acetaldehyde with the condensation product of 3 moles of acetaldehyde and 2 moles of aniline. The invention also comprises the new materials obtained.

A method of making a compound in which 3 moles of acetaldehyde are combined with 2 moles of aniline is set forth in my copending application Serial No. 627,326, filed on March 24, 1923. The compound so produced is believed to be in the nature of, or closely related in chemical constitution to, derivatives of tetrahydro-quinoline, which possesses what I choose to call a reactive methyl group, having the property of condensing with one or more molecules of an aldehyde to produce further products.

According to the preferable mode of procedure, acetaldehyde is reacted with aniline to produce a compound in which 3 moles of acetaldehyde are combined with 2 moles of aniline, as claimed in my aforementioned application Serial No. 627,326, and the material so obtained is dehydrated by evaporation at temperatures no higher than 105° C., until the moisture content is substantially reduced. Advantageously the dehydration may be continued until the moisture content is approximately 2%. I have found that this dehydrated compound will react with further aldehyde and in particular with aliphatic aldehydes higher than formaldehyde, as acetaldehyde and still higher aldehydes. Dehydration of this compound to a substantial extent, at least, is necessary for obtaining optimum yields, the presence of water in substantial proportions apparently being unfavorable to the reaction of aliphatic aldehydes above formaldehyde upon this compound.

One example of the ways in which a process within my invention can be carried out is the following:

132 parts of the dehydrated condensation product of acetaldehyde and aniline above described are refluxed with 79.5 parts of acetaldehyde for a period of about 14 or 15 hours at a temperature above the boiling point of the aldehyde, but below the boiling point of water. The refluxing period can be reduced by use of efficient heating means. At the end of the reaction period I preferably discontinue the refluxing, and heat to a temperature of not over 105° C., to evaporate the water and remove the excess aldehyde. In order to avoid frothing and foaming I may pass a current of air through the mass while the water is being evaporated. When the water has been practically all removed it is often advantageous to heat at a somewhat higher temperature for a period of about ½ hour or less, but in no case is it advisable to heat above about 115° C. The resinous product so obtained contains approximately 2% of moisture, is hard and vitreous, and can be readily ground and sifted.

A similar change takes place when acetaldehyde is reacted substantially as disclosed above with the primary aldehyde derivative of anhydro formaldehyde aniline, or with the primary aldehyde derivative of the condensation product formed by the interaction of aliphatic aldehydes, such as formaldehyde or acetaldehyde on primary amines such as aniline, o-toluidine, m-toluidine, p-toluidine, the xylidines, aminocymene, etc. The quantity of aldehyde taken to combine with the aldehyde-amine condensation product is preferably in excess of that actually required to complete the change.

Although in the example given I have specified the use of acetaldehyde on the dehydrated combination product of 3 moles of acetaldehyde and 2 moles of aniline, it is to be understood that my invention is not limited solely to this, but that other similarly constituted materials and compounds may be used. Broadly my invention comprises the manufacture of a compound by condensation reaction of an aliphatic aldehyde above formaldehyde with the condensation product of aliphatic aldehydes and aromatic primary amines.

I claim:

1. A hard resinous compound formed by the action of acetaldehyde on the reaction product of 3 moles of acetaldehyde with 2 moles of aniline.

2. The process of making a hard resinous compound, which comprises reacting acetaldehyde with the reaction product of 3 moles of acetaldehyde with 2 moles of aniline.

3. A hard resinous compound formed by the action of acetaldehyde on the dehydrated reaction product of 3 moles of acetaldehyde with 2 moles of aniline.

4. The process of making a hard resinous compound, which comprises reacting acetaldehyde with the dehydrated reaction product of 3 moles of acetaldehyde with 2 moles of aniline.

5. A hard resinous compound formed by the action of acetaldehyde on the dehydrated reaction product of acetaldehyde and aniline.

6. The process of making a hard resinous compound, which comprises reacting acetaldehyde on the dehydrated reaction product of acetaldehyde and aniline.

7. A hard resinous compound formed by the action of an aliphatic aldehyde higher than formaldehyde on the dehydrated reaction product of 3 moles of acetaldehyde with 2 moles of aniline.

8. The process of making a hard resinous compound, which comprises reacting an aliphatic aldehyde higher than formaldehyde on the dehydrated reaction product of 3 moles of acetaldehyde with 2 moles of aniline.

9. A hard resinous product obtained by the reaction of an aliphatic aldehyde higher than formaldehyde on the reaction product of an aliphatic aldehyde and an aromatic primary amine.

10. The process of making a hard resinous compound, which comprises reacting an aliphatic aldehyde higher than formaldehyde on the reaction product of an aliphatic aldehyde and an aromatic primary amine.

11. The process of making resinous material, which comprises reacting acetaldehyde and aniline under conditions to produce a reaction product having substantially 3 moles of acetaldehyde and 2 moles of aniline, refluxing said reaction product together with acetaldehyde, evacuating water, and then cooling and grinding.

12. The process of making a resinous material, which comprises reacting acetaldehyde and aniline in the proportion of substantially 3 moles of acetaldehyde to 2 moles of aniline, evacuating water from the product so obtained, introducing acetaldehyde into said product in the proportion of approximately 79.5 parts of acetaldehyde to 132 parts of said product, refluxing the mixture at a temperature above the boiling point of acetaldehyde and below the boiling point of water for several hours, evacuating water, then further heating at a temperature not to exceed 115° C., and then cooling and grinding.

13. A hard resinous compound formed by reacting approximately 79.5 parts of acetaldehyde with approximately 132 parts of the dehydrated reaction product of 3 moles of acetaldehyde and 2 moles of aniline.

14. The process of making a hard resinous compound, which comprises reacting approximately 79.5 parts of acetaldehyde with approximately 132 parts of the dehydrated reaction product of 3 moles of acetaldehyde and 2 moles of aniline.

In testimony whereof, I have signed my name hereto.

CLAYTON OLIN NORTH.